United States Patent [19]

Visnic

[11] Patent Number: 4,800,948
[45] Date of Patent: Jan. 31, 1989

[54] METHOD OF FORMING A THERMALLY ACTIVATED PRESSURE RELIEF VALVE

[75] Inventor: James E. Visnic, West Lafayette, Ind.

[73] Assignee: Aluminum Company of America, Pittsburgh, Pa.

[21] Appl. No.: 43,978

[22] Filed: Apr. 29, 1987

[51] Int. Cl.[4] .............................. B22D 27/15
[52] U.S. Cl. ................... 164/63; 164/114; 29/157.1 R; 137/74
[58] Field of Search ............ 29/157.1 R, 157.1 A, 29/460, 530; 137/74, 587, 599; 164/63, 98, 114; 220/89 B; 239/397.5

[56] References Cited

U.S. PATENT DOCUMENTS

| | | | |
|---|---|---|---|
| 47,076 | 3/1865 | Smith | 137/74 X |
| 195,367 | 9/1877 | Hiller | 137/74 X |
| 1,211,173 | 1/1917 | King . | |
| 1,303,248 | 5/1919 | Breidenbach . | |
| 1,528,303 | 4/1920 | Rockwell | 164/114 |
| 1,876,938 | 9/1932 | Horne . | |
| 1,984,375 | 12/1934 | Johnston | 221/73.5 |
| 2,020,075 | 11/1935 | Meagher | 277/60 |
| 2,040,776 | 5/1936 | Marvin | 137/53 |
| 3,472,427 | 10/1969 | Schaefer | 222/147 |
| 3,554,227 | 1/1971 | Yocum | 137/588 |
| 3,996,992 | 12/1976 | Johnson | 164/63 |
| 4,059,125 | 11/1977 | Sugimura et al. | 137/73 |
| 4,335,734 | 6/1982 | Trinkwalder | 137/77 |
| 4,352,365 | 10/1982 | Boccardo | 137/68 |
| 4,407,432 | 10/1983 | Shichman | 222/54 |
| 4,506,423 | 3/1985 | Nakamura et al. | 29/157 R |

FOREIGN PATENT DOCUMENTS

| | | | |
|---|---|---|---|
| 93165 | 10/1938 | Sweden | 137/74 |
| 582896 | 12/1977 | U.S.S.R. | 164/98 |
| 367731 | 2/1932 | United Kingdom | 220/89 B |

OTHER PUBLICATIONS

Superior Valve Company Catalog HP-82, pp. 1-3, 12, 14 and 17-21.
Sherwood-West Corp. Catalog, "Compressed Gas Equipment", pp. 1-5, 11, 13 and 19.
Baker CAC, Inc., pp. 1 and 3.
Rego Company, Catalog entitled "Gas Plant & Cryogenic Equipment", pp. 1, 2 and 7.

*Primary Examiner*—P. W. Echols
*Assistant Examiner*—Andrew E. Rawlins
*Attorney, Agent, or Firm*—Thomas J. Connelly; David W. Brownlee

[57] ABSTRACT

A method is disclosed for forming a thermally activated pressure relief valve which is designed to be attached to a pressure vessel. The valve contains a body having an inlet and an outlet in fluid communication with each other and an insert having a helical groove formed about its outer periphery. The method includes securing the insert in the outlet such that the helical groove cooperates with the body to form a helical passageway. A molten fusible material is then introduced into one end of the helical passageway. A force is exerted on the material to cause it to move through the helical passageway and displace any trapped air, gas or foreign matter which might be present therein. Once the material completely fills the passageway, it is allowed to cool and solidify. This method is advantageous in producing a safety relief valve which can operate at higher service pressures and temperatures over an extended period of time.

26 Claims, 2 Drawing Sheets

METHOD OF FORMING A THERMALLY ACTIVATED PRESSURE RELIEF VALVE

FIELD OF THE INVENTION

This invention relates to a method of forming a thermally activated pressure relief valve which is designed to be attached to a pressure vessel and will relieve the pressure within the vessel once the outside temperature exceeds a predetermined value.

BACKGROUND OF THE INVENTION

Most pressure vessels are equipped with a relief valve to prevent catastrophic rupture in case of excessive temperature or pressure. Should the pressure vessel be in a fire, it is possible that the volume of liquid or gas contained therein will increase rapidly and reach a situation where the pressure is higher than it was at room temperature. For cylinders constructed of aluminum, Kevlar or plastic, this can pose a very critical problem. As the temperature increases, the material of which the container is constructed tends to stretch, soften or weaken and thereby is unable to hold the pressure for which the vessel was designed.

A number of temperature and pressure activated relief valves are taught in U.S. Pat. Nos. 2,040,776; 3,472,427; 4,059,125; and 4,352,365. In addition, pressure and/or temperature activated relief valves are currently commercially available through Sherwood-West Corporation of Irvine, Calif.; Rego Company of Chicago, Ill.: Baker Cat, Inc. of Belle Chasse, La.: and Superior Valve Company of Washington, Pa. Some of these valves use a fusible metal positioned within a narrow passageway which is designed to melt at a predetermined temperature and be blown out by the pressure of the substance contained within the pressurized cylinder. One of the drawbacks with using a fusible metal is that when the valve is assembled a number of voids can occur within the passageway filled with the fusible metal. These voids shorten the life of the valve by allowing the fusible metal to extrude into the voids, thereby creating possible leaks. If the device is a combination rupture disc/fusible metal device, the voids may minimize support of the disc and lead to premature failure. The presence of any foreign matter trapped within the fusible metal can also create a problem in that the relief valve is designed to release at a certain temperature or pressure. If foreign matter is present, the valve could release prematurely thereby minimizing its usefulness.

Now a method has been invented for forming a thermally activated pressure relief valve which assures that as the fusible metal is inserted into a helical passageway the presence of voids and foreign matter will be minimized of eliminated.

SUMMARY OF THE INVENTION

Briefly, the present invention relates to a method of forming a thermally activated pressure relief valve which is designed to be used with a pressurized cylinder. The thermally activated pressure relief valve will be activated by excessive temperatures such that the pressurized substance within the container can be released before the cylinder catastrophically ruptures. The valve includes a body having an inlet and an outlet which are in fluid communication with each other. The valve also contains an insert having a helical groove formed about its outer periphery.

The method includes securing the insert in the outlet so that the helical groove cooperates with the body to form a helical passageway. A molten fusible material is then introduced into the helical passageway while a force is exerted on the material to cause its movement therethrough. This force can either be a vacuum which causes the material to be drawn through the passageway or it could be a centrifugal force which pushes the material through the passageway. By exerting a force on the molten fusible material, the material can be drawn or pushed into and through the helical passageway, thereby displacing any air or foreign matter trapped therein. When a vacuum is applied to the material, a porous filter is used to allow air to escape from the vacuum side of the passageway while stopping the movement of the material itself. In the case of centrifugal force, a plug is used to block off one end of the passageway and the material is forced outward toward the plug. As the material flows outward toward the plug, any trapped air, gas or fluxing residue will be displaced and can escape out of the entrance through which the molten material is entering. Once the passageway is completely filled, the molten material is allowed to cool and solidify.

The general object of this invention is to provide a method of forming a thermally activated pressure relief valve. A more specific object of this invention is to provide a method of forming a thermally activated pressure relief valve wherein a fusible material is used to block a passageway and the passageway is free of any voids.

Another object of this invention is to provide a simple, accurate and quick method of forming a thermally activated pressure relief valve using a fusible material.

Still another object of this invention is to provide a method of filling a helical passageway with a predetermined amount of molten fusible material such that air or gas pockets are eliminated.

A further object of this invention is to provide a method of forming a thermally activated pressure relief valve which will can operate at a higher service pressure for an extended period of time.

Other objects and advantages of the present invention will become more apparent to those skilled in the art in view of the following description and the accompanying drawings.

DETAILED DESCRIPTION OF THE PREFERRED EMBODIMENTS

Figure 1:
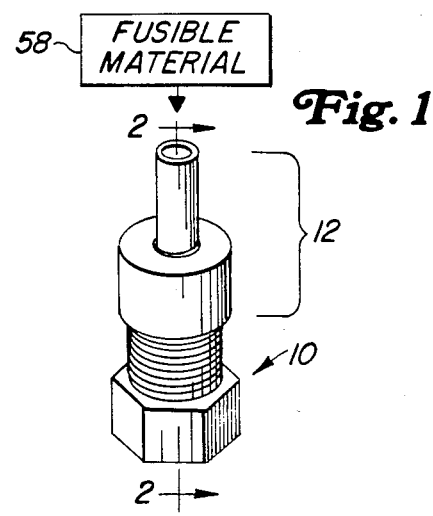
FIG. 1 is an assembly view of a thermally activated pressure relief and filling assembly.
Figure 2:
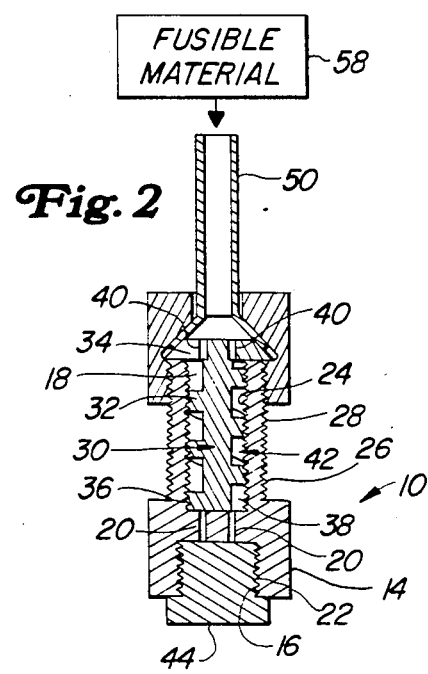
FIG. 2 is a cross-sectional view taken along line 2—2 of FIG. 1 and shows internal helical passageway.
Figure 3:
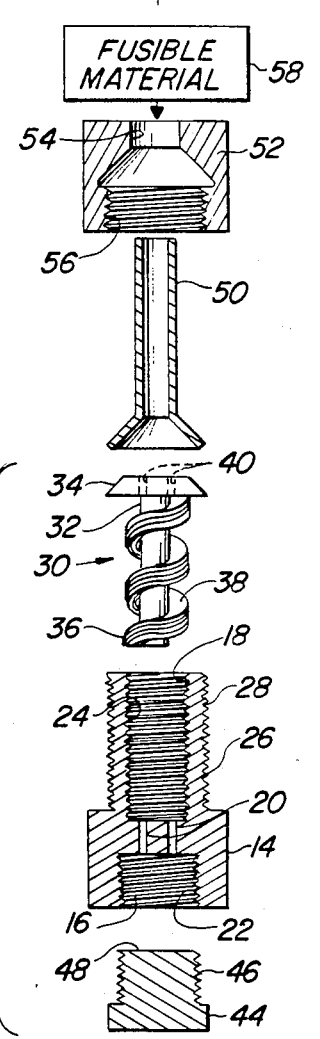
FIG. 3 exploded view of the thermally activated pressure relief filling apparatus.

Referring to FIG. 1, a thermally activated pressure relief valve 10 is shown having a filling apparatus 12 secured to it, As best seen in FIGS. 2 and 3, the thermally activated pressure relief valve 10 includes a body 14 having an inlet 16 and an outlet 18 formed therein. The inlet 16 and the outlet 18 are fluidly connected by at least one and preferably two or more small apertures 20 which can be arranged in a circular configuration. The inlet 16 and the outlet 18 are shown as bores having internal screw threads 22 and 24 formed about their inner peripheries. An external portion 26 of the body 14 also contains a screw thread 28. It should be noted that other types of fastening means can be utilized in place of the screw threads, such as using a press fit between the parts.

The thermally activated pressure relief valve 10 further includes an insert 30 having an elongated stem 32 and a head 34 formed on an end thereof. The outer periphery of the stem 32 contains a screw thread 36 and has a helical groove 38 formed therein. The bottom of the groove 38 extends below the root of the screw thread 36 and the cross-sectional configuration of the groove can vary. Either a rectangular or semi-circular cross-sectional configuration is preferred since those are the easiest to machine. The head 34 contains at least one and preferably two or more small apertures 40 formed therethrough. The apertures 40 can be arranged in a circular configuration and are designed to intersect the helical groove 38 formed in the stem 32. The cross-sectional area of the apertures 20 and 40 should be less than the cross-sectional area of the helical groove 38.

When the insert 30 is inserted into the outlet 18 of the body 14, the helical groove 38 cooperates with the body 14 to form a helical passageway 42 which communicates with the apertures 20 and 40. This helical passageway 42 provides an avenue of fluid communication between the inlet 16 and the outlet 18. In normal use, the inlet 16 is adapted to be attached to a pressure cylinder or container and is in fluid communication with a pressurized substance contained therein. The pressurized substance can be a liquid, powder or gas. The outlet 18 of the relief valve 10 is normally opened to the atmosphere, although it may have a tube or hose connected to it so as to direct the pressurized fluid away to an area or chamber having a lower pressure value than that present in the cylinder.

One method of forming the thermally activated pressure relief valve 10 is to secure the insert 30 into the outlet 18 so that the helical groove 38 cooperates with the body 14 to form the helical passageway 42. Before doing this, it is advantageous to clean the body 14 and the insert 30 to assure the removal of any foreign matter, especially in the helical groove 38. This can be done ultrasonically or chemically. Once cleaned, it is advisable to submerge the parts in a rinse solution, such as acetone, and then air dry. A flux can be applied to either the body 14 or the insert 30, or both, so as to assure that when they are assembled there will be no openings that cold later provide a path for gas to leak out. This is particularly useful when the relief valve 10 is to be used as a safety valve on a high pressure cylinder.

A plug 44 having a threaded projection 46 is screwed into the inlet 16 of the body 14 so as to close off the apertures 20. Preferably, the plug 44 has a flat inner surface 48 which will mate in a flush manner with the inner end of the inlet bore 16. The flush fit assures that any molten fusible material that enters the apertures 20 can solidify without extending into the inlet 16. This saves the need for having to grind off this portion of the fusible material at a later time. After the plug 44 has been secured to the inlet 16 so as to block off fluid flow therethrough, a hollow funnel 50 is secured over the outlet 18 by a bushing 52. The bushing 52 contains a through bore 54 and has a threaded portion 56. The threaded portion 56 will engage the screw thread 26 formed on the body 14.

A fusible material 58, such as white lead or a eutectic alloy, is introduced into the funnel 50. The fusible material 58 can be a lead alloy, having a melting point between 150° and 300° F, preferably above 200° F, and most preferably either 212° F. or 217° F. The fusible material 58 can also be of a synthetic resin such as fluoride-containing polymers, nylon, etc. One supplier of such fusible material is Cerro Metal Products, a division of The Marmon Group, Inc., P.O. Box 388, Bellefonte, Pa. 16823.

The fusible material 58 can be preheated to a temperature above its melting point, preferably between 200 and 300° F., more preferably above 250° F, so as to become molten before it is introduced into the funnel 50. It should be noted that it is also possible to introduce solid fusible material or semi-solid fusible material into the funnel 50 and then heat the funnel 50 and the relief valve 10 to a temperature above the melting point of the fusible material 58. Either approach is possible, although it is preferable to first heat the fusible material 58 to a molten state. With the thermally activated pressure relief valve 10 in a vertical orientation, molten fusible material 58 is added by pouring it into the funnel 50. It is also advisable to preheat the funnel 50 and the valve 10 so as to facilitate fluid flow and to prevent solidification. The material 58 will flow downward through the apertures 40, through the helical groove 38 and into the apertures 20 at the opposite end. The fusible material 58 will have a certain density and viscosity that will displace any trapped air that may be present in the helical passageway 42. This displaced air will be released upward and out into the funnel 50. It should be noted that as a convenience, the insertion of a predetermined amount of fusible material 58 into the funnel 50 will reduce the necessity of having to grind off solid material from the outer face at a later date. However, it is also advantageous to add a little extra fusible material 58 so as to assure that the helical passageway 42 will be free of any voids.

Figure 4:
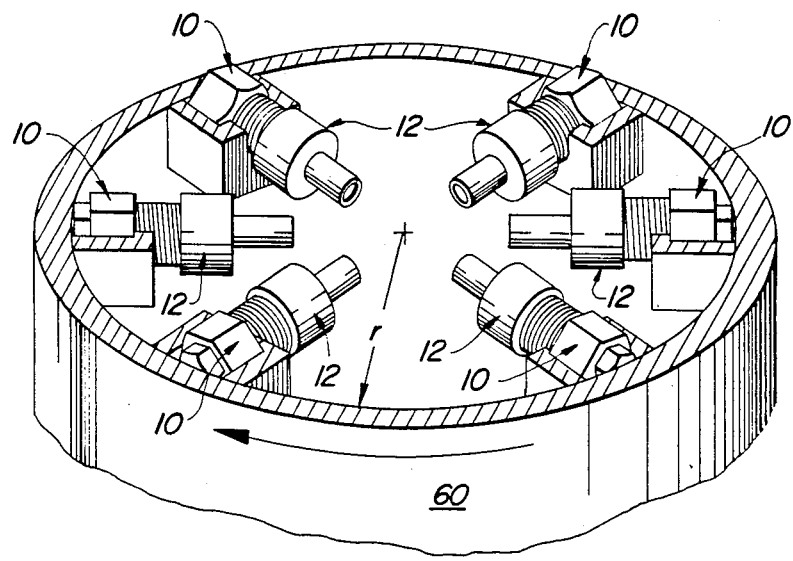
FIG. 4 is a perspective view of a centrifuge holding six thermally activated pressure relief valves.
Figure 5:
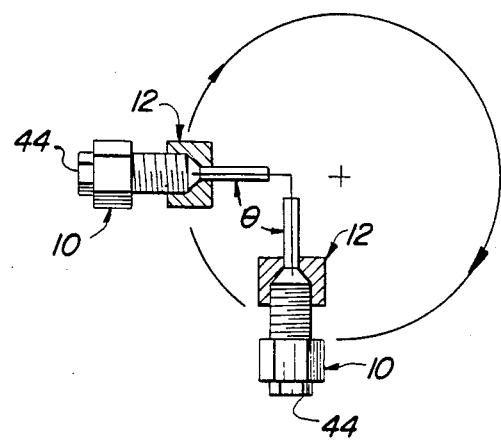
FIG. 5 is a schematic depiction of the thermally activated pressure relief valve and filling apparatus being rotated at an angle theta between a vertical orientation and a horizontal orientation.

Referring to FIGS. 4 and 5, the thermally activated pressure relief valve 10 and the filling apparatus 12 are inserted into a centrifuge 60 whereby they can be rotated at a relative centrifugal force. As depicted in FIG. 4, more than one valve 10 and filling assembly 12 can be inserted into the centrifuge 60 so as to facilitate production of the relief valves 10. The centrifuge 60 has a predetermined radius designated (r) and it can be rotated either clockwise or counterclockwise at variable revolutions per minute. The relative centrifugal force exerted on the molten fusible material 58 can be calculated using: the radius (cm) times the rpm$^2$ times a constant (0.00001118). Experimentation has shown that a relative centrifugal force (RCF) of at least 150 centimeters/minute$^2$ is acceptable. A force of at least 175 centimeters/minute$^2$, and preferably about 190 centimeters/minute$^2$, is sufficient to insure that any air or gas trapped in the helical passageway 42 will be displaced by the fusible material 58.

Each thermally activated pressure relief valve 10 can be inserted into the centrifuge 60 such that it is held in place by a support structure 62. The exact type of structure will change depending upon the shape and configuration of the relief valve 10. Experimentation has shown that a time period of about 3 minutes is sufficient to assure that any air trapped in the passageway 42 can be displaced. As depicted in FIG. 5, it is preferable to tilt both the relief valve 10 and the filling apparatus 12 through an angle θ which is approximately between 45° and 90°, more preferably between 60° and 90°. This tilting places the plug 44 to the outside surface of the centrifuge 60 and away from its center. Such action causes the helical passageway 42 to lie in either an inclined or horizontal plane and this allows any air or gas trapped therein to have an avenue of escape as the molten fusible material 58 is being forced into the passageway 42 by centrifugal force.

After the relief valve 10 has been subjected to the centrifugal force, it is removed and the material 58, which has solidified, is allowed to cool. At this time both the filling apparatus 12 and the plug 44 are removed and any solidified material 58 that may project beyond the ends of the apertures 20 and 40 is removed by grinding, fracturing or some other means.

As a matter of convenience, it may be economical to preheat the centrifuge 60 or to operate it in a temperature controlled housing. Such action will assure that the molten material 58 will be allowed to flow into and through the helical passageway 42, thereby filling it completely without having to worry about any voids being present. This is important in very small size valves for the helical passageway 42 and the apertures 20 and 40 tend to be very small.

Figure 6:
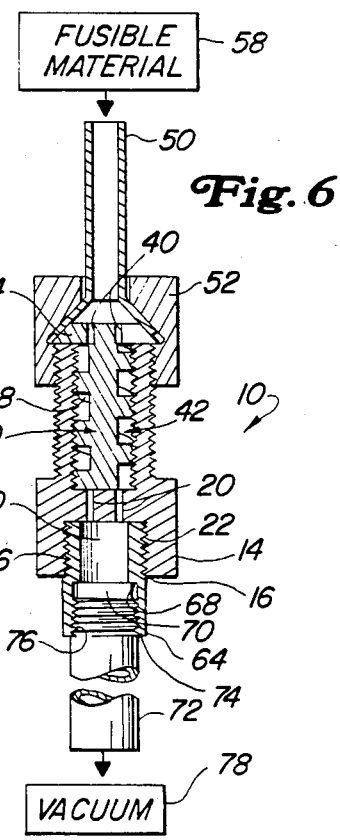
FIG. 6 a cross-sectional view of a thermally activated pressure relief valve and filling apparatus using a vacuum to draw a molten fusible material through the helical passageway.

Referring to FIG. 6, an alternative method of forming the thermally activated pressure relief valve 10 is shown. In this method a hollow tube 64 having a threaded exterior portion 66 is secured in the inlet 16. As stated earlier, although threads are shown, a press fit or any other type of connection could be utilized. The tube 64 contains an internal step 68 which provides a seat for a porous filter 70. The filter can be constructed of various types of porous materials, such that it will allow air to pass through it while stopping the flow of molten material 58. A second tube 72, having an external thread 74 located at one end, is threaded into an internal thread 76 formed on the opposite end of the hollow tube 64. The second tube 74 forms a retainer for holding the porous filter 70 in place. Again, other means of attaching the tubes 64 and 72 together can be utilized as well as other means for holding the filter 70 in place. The opposite end of the tube 72 is connected to a source of vacuum 78. The vacuum 78 does not have to be very great in order to draw the molten material 58 through the helical passageway 42.

Molten fusible material 58 is then introduced into the opposite end of the valve 10, as explained earlier, and the vacuum causes the material 58 to be drawn through the apertures 40 and into the helical passageway 42. The molten material 58 will be drawn through the apertures 20 and into a riser space 80 which is formed above the filter 70. This riser space 80, which is optional, enables any trapped air, gas or foreign matter that may be present to be expelled from the helical passageway 42. This riser space 80 should have a sufficient cross-sectional area such that the displaced air or gas can come in contact with and pass through the porous filter 70.

As stated earlier, both the relief valve 10 and the filling apparatus 12 can be preheated to a temperature above the melting temperature of the fusible material 58. For example, when the fusible material 58 has a melting temperature of 212° or 217° F., it is advantageous to preheat the relief valve 10 and the filling apparatus 12 to a temperature between 250° and 300° F. It is also advisable to clean the parts, either ultrasonically or chemically, before the insert 30 is secured to the body 14.

Once the fusible material 58 has been allowed to solidify, the parts can be disassembled and any excess material can be removed.

While the invention has been described in conjunction with two specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A method of forming a thermally activated pressure relief valve comprising the steps of:
   (a) forming a helical passageway in a body;
   (b) introducing a molten fusible material into said helical passageway;
   (c) exerting a force on said fusible material to cause movement of said material through said helical passageway thereby displacing any air or gas trapped therein and filling said passageway; and
   (d) allowing said fusible material to solidify.

2. A method of forming a thermally activated pressure relief valve having a body with an inlet and an outlet in fluid communication with each other and an insert having a helical groove formed in the outer periphery thereof, said method comprising:
   (a) securing said insert into said outlet so that said helical groove cooperates with said body to form a helical passageway;
   (b) introducing a molten fusible material into said helical passageway:
   (c) exerting a force on said fusible material to cause movement of said material through said helical passageway thereby displacing any air or gas trapped therein and filling said passageway; and
   (d) allowing said fusible material to solidify.

3. The method of claim 2 wherein said force exerted on said fusible material is a centrifugal force applied by rotating said valve.

4. The method of claim 2 wherein said force exerted on said fusible material is a vacuum applied to one end of said helical passageway.

5. The method of claim 2 wherein said body and insert are preheated prior to the introduction of the molten fusible material.

6. The method of claim 5 wherein said body and insert are preheated to a temperature above 250° F.

7. A method of forming a thermally activated pressure relief valve having a body with an inlet and an outlet in fluid communication with each other and an insert having a helical groove formed in the outer periphery thereof, said method comprising:
   (a) securing said insert into said outlet so that said helical groove cooperates with said body to form a helical passageway:

(b) inserting a plug into said inlet to block off fluid flow therethrough:
(c) securing a funnel over said outlet to form an assembly providing fluid communication with said helical passageway and orienting said assembly in a vertical position;
(d) introducing molten fusible material through said funnel and into said helical passageway:
(e) rotating said assembly to exert a centrifugal force on said fusible material thereby causing said material to flow toward said plug and displace any trapped air or gas present in said helical passageway: and
(f) cooling said assembly to solidify said fusible material.

8. The method of claim 7 wherein said body, insert and funnel are preheated before said molten fusible material is introduced.

9. The method of claim 8 wherein said body and insert are preheated to a temperature of between 250° and 300° F.

10. The method of claim 7 wherein said body and insert are cleaned and fluxed before being assembled.

11. The method of claim 10 wherein said body and insert are ultrasonically cleaned.

12. A method of forming a thermally activated pressure relief valve having a body with an inlet and an outlet in fluid communication with each other and an insert having a helical groove formed in the outer periphery thereof, said method comprising:
(a) cleaning said body and insert to remove any foreign matter and applying a flux thereto;
(b) securing said insert into said outlet so that said helical groove cooperates with said body to form a helical passageway;
(c) inserting a plug into said inlet to block off fluid flow therethrough and securing a hollow funnel over said outlet to form an assembly providing fluid communication with said helical passageway:
(d) orienting said assembly in a vertical position and preheating said assembly to a desired temperature;
(e) introducing a predetermined amount of a molten fusible material to said assembly and rotating said assembly about an inclined plane to exert a centrifugal force on said fusible material thereby causing said material to flow toward said plug and displace any trapped air or gas present in said helical passageway: and
(f) cooling said assembly to solidify said fusible material.

13. The method of claim 12 wherein any excess solidified material present on said valve is removed.

14. The method of claim 12 wherein said assembly is rotated at a relative centrifugal force of at least 150 cm/min$^2$ for a selected period of time.

15. The method of claim 12 wherein said body and insert are ultrasonically cleaned, subjected to a rinse solution and then are air dried before being assembled.

16. The method of claim 15 wherein said body and insert are rinsed in acetone prior to being assembled.

17. A method of forming a thermally activated pressure relief valve for use on a pressurized cylinder to help prevent rupture in case of exposure to high temperatures, said valve having a body with an inlet and an outlet in fluid communication with each other and an insert having a helical groove formed in the outer periphery thereof, said method comprising:
(a) cleaning said body and insert to remove any foreign matter;
(b) securing said inert into said outlet so that said helical groove cooperates with said body to form a helical passageway:
(c) securing a funnel over said outlet to form an assembly providing fluid communication with said helical passageway;
(d) attaching a tube to said inlet having a porous filter fitted therein, said tube being connected to a source of vacuum;
(e) introducing a molten fusible material through said funnel and into said helical passageway and applying a vacuum to said tube to assist in drawing said material completely through said helical passageway and into contact with said porous filter, said filter allowing air or gas to pass through while blocking the passage of said material; and
(f) allowing said material to solidify.

18. The method of claim 17 wherein said porous filter is distally spaced from said inlet.

19. The method of claim 17 wherein said body, insert and funnel are preheated before said material is introduced.

20. The method of claim 19 wherein said body, insert and funnel are preheated to a temperature of between 250° and 300° F.

21. The method of claim 17 wherein said body and insert are chemically cleaned.

22. A method of forming a thermally activated pressure relief valve having a body with an inlet and an outlet and at least one aperture providing a fluid connection therebetween, an insert having a helical groove which is secured in said outlet to form a helical passageway through said valve, said method comprising:
(a) inserting a plug into said inlet to block fluid flow therethrough;
(b) attaching a funnel to said outlet to form an assembly providing fluid communication with said helical passageway and introducing a fusible material into said funnel;
(c) heating said assembly to melt said fusible material;
(d) rotating said assembly to exert a centrifugal force on said fusible material thereby causing said material to flow toward said plug and displace any trapped air or gas present in said helical passageway, said air or gas being forced out of said body to produce a filled passageway free of any voids: and
(e) cooling said assembly to solidify said fusible metal.

23. The method of claim 22 wherein said assembly is rotated at a relative centrifugal force of at least 150 cm/min$^2$.

24. The method of claim 23 wherein said assembly is rotated at a relative centrifugal force of at least 190 cm/min$^2$.

25. The method of claim 22 wherein said assembly is heated to a temperature above the melting temperature of said fusible metal.

26. The method of claim 25 wherein said assembly is heated to a temperature of between 200° and 300° F.

* * * * *